C. M. EVELETH.
WEATHER STRIP.
APPLICATION FILED AUG. 2, 1918.
1,298,190.
Patented Mar. 25, 1919.
2 SHEETS—SHEET 2.
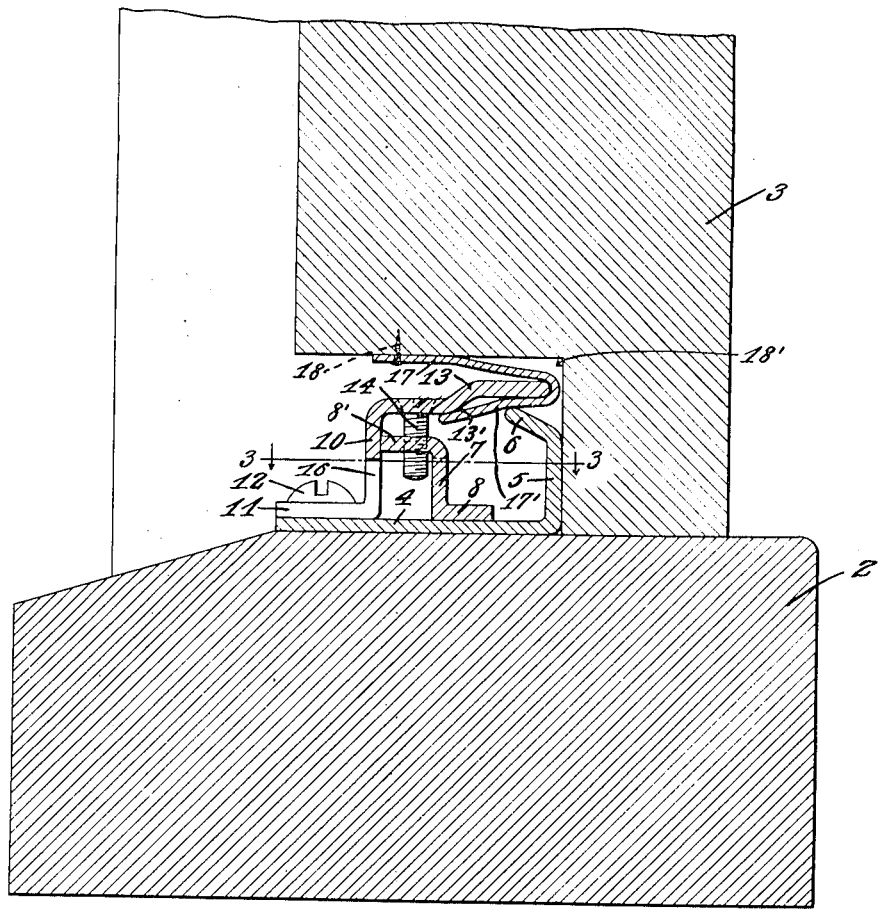
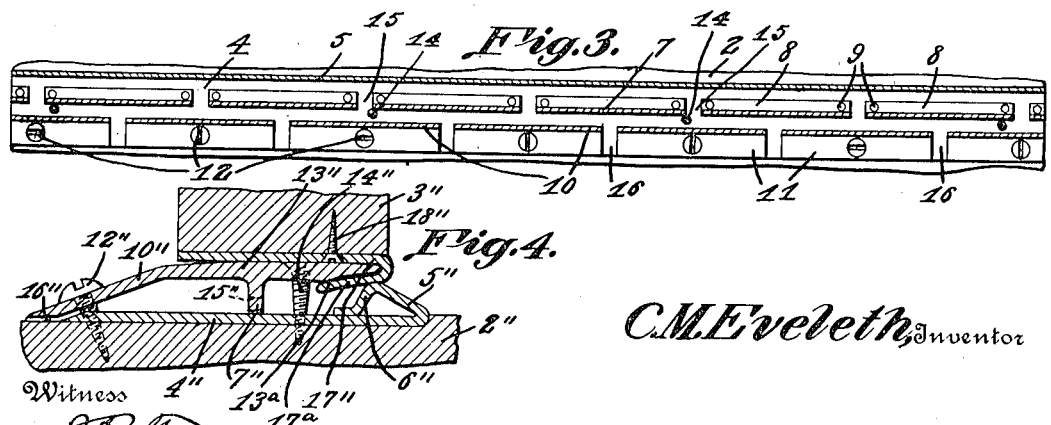

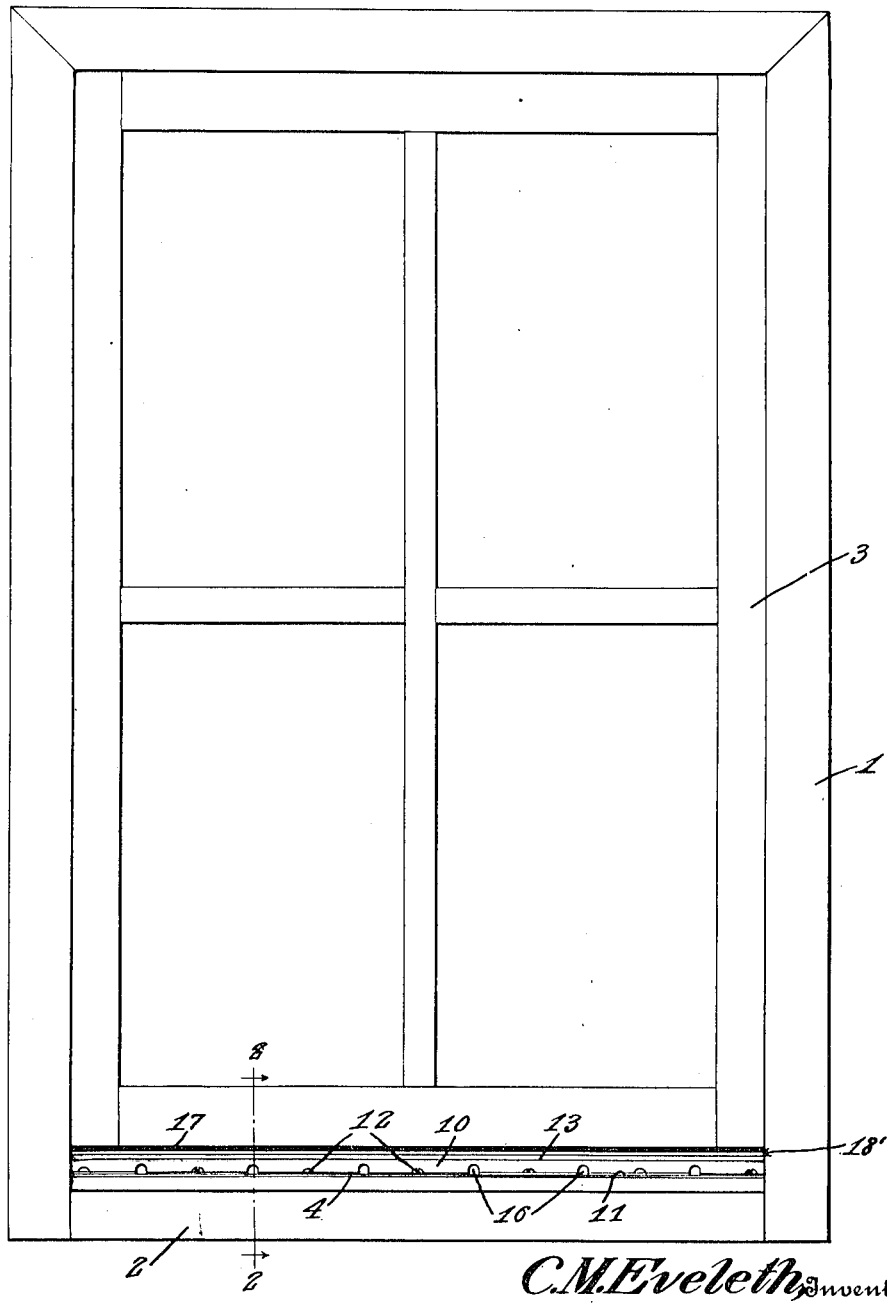

UNITED STATES PATENT OFFICE.

CLARENCE M. EVELETH, OF RIVER FOREST, ILLINOIS.

WEATHER-STRIP.

1,298,190.     Specification of Letters Patent.     Patented Mar. 25, 1919.

Application filed August 2, 1918. Serial No. 247,990.

*To all whom it may concern:*

Be it known that I, CLARENCE M. EVELETH, a citizen of the United States, residing at River Forest, in the county of Cook and State of Illinois, have invented a new and useful Weather-Strip, of which the following is a specification.

The subject of this invention is a weather strip intended for use at the bottom of swinging or hinged windows, and on doors.

The main object of the invention is the provision of a weather strip which will not allow rain or snow to beat beneath a door or window.

Another object of the invention is the provision of means for collecting water driven beneath a door or window and returning the same to the outside.

A still further object of the invention is to generally improve the construction and enhance the utility of weather strips.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawings, wherein:—

Figure 1 is a view in front elevation of a weather strip constructed in accordance with the invention, and shown applied to a window;

Fig. 2 is a detail view in section taken on the line 2—2 of Fig. 1;

Fig. 3 is a longitudinal section taken on the line 3—3 of Fig. 2;

Fig. 4 is a detail view in cross section of a modified form of the device.

Referring to the drawings by numerals of reference:—

A window frame or casing is indicated at 1, provided with the window sill 2, and having the window 3 hinged to swing therein.

The weather strip is shown as attached to the sill 2, and consists of a plate 4 which rests upon, and extends longitudinally of the sill, and which has its inner edge turned upwardly to form the stop 5, the upper edge of which stop is bent outwardly to form the flange 6 which overhangs the plate 4.

Arranged longitudinally of the plate 4, and near the center thereof, is a strip 7 which is of substantially Z-shape in cross section, and one flange, 8, of which is secured by rivets 9 or otherwise to the plate 4, while the other flange, 8', extends forwardly of the strip, or away from the upturned edge 5. The edge of the forwardly extending flange 8' contacts a strip 10, one end of which is bent at right angles to form the flange 11, which is secured by screws 12 to the plate 4 and sill 2. The other edge of the strip 10 is bent to form the rearwardly extending flange 13, which flange is offset or bent to provide the longitudinally extending rib or ridge 13'. The flange 13 overlies the flange 6, from the edge of which it is slightly spaced.

Screws 14 pass through apertures formed in the flange 13 and are threaded into apertures formed in the flange 8' of the strip 7 and these screws serve to adjust the distance of the flange 13 from the flange 6.

The strip 7 is provided with spaced discharge openings or weep holes 15, and the strip 10 is provided with similar weep holes 16. The holes 16 are offset from the holes 15 so that they will not be in alinement to permit rain or snow to be blown through both openings. These holes are provided for the purpose of permitting rain to run out of the chambers of the strip after the same has been blown into the chambers during a heavy storm.

In order to further close the space between the swinging member and the sill, a strip of flexible metal 17 is secured by nails 18 or otherwise to the downwardly facing wall of the undercut or rabbeted portion 18' of the swinging member 3, and is bent back upon itself along one longitudinal edge to provide the tongue 17' which is adapted to enter between the flange 6 and the flange 13, and the edge of which strikes and rests against the rib or ridge 13', thereby completely and securely closing the opening.

In the modification shown in Fig. 4 the structure is the same as that heretofore set forth with such changes made therein as are made necessary to form the strip as a door sill or threshold. In this instance a plate 4" is provided and its inner edge with the bent portion 5", which partially overlies the plate 4" and rises therefrom in an inclined position. The edge of this strip is bent downwardly, as at 6″, to contact the plate 4″, and to provide a ridge, as seen, corresponding to the edge of the flange 6 heretofore described.

A coöperating strip overlies the strip 4″, and consists of the inclined portion 10″, and the horizontally disposed portion 13″, and from which depends a longitudinally disposed flange 7″, which is positioned between the longitudinal edges of the plate or strip, and, substantially, centrally thereof. The portion 10″ of the strip is apertured to aline with apertures in the plate 4″ for the reception of screws 12″, by which the plate 4″ and the strip are secured in place to the floor or support 2″.

The portion 10″ of the strip is provided with weep holes 16″, and the depending flange 7″ is also provided with weep holes 15″ which are out of alinement with the holes 16″ and which coöperate therewith to allow water to flow from the strip.

A flexible metal strip 17″ is secured to the lower edge of the door by screws 18″ or otherwise, and the strip is bent back upon itself to form the tongue 17ª, which is adapted to enter between the upwardly slanting portion 5″ and the rear edge of the portion 13″, and have its edge contact or rest against a shoulder 13ª, formed longitudinally of the portion 13″. An adjusting screw 14″ passes through apertures formed in the portion 13″ and the plate 4″ and enters the sleeper or support 4″, and serves to adjust the distance between the upwardly inclined portion 5″ and the edge of the portion 13″. While only one adjusting screw 14″ is shown herein, it is to be understood that any suitable number of such screws may be provided on a weather strip.

It is thought that, from the foregoing description, the operation of the device will be amply understood without an extended and special description thereof.

Having thus described the invention, what is claimed as new and sought by Letters Patent, is:—

1. A weather strip, including a plate formed with an upturned longitudinal edge, a strip secured along that longitudinal edge of the plate remote from the upturned edge, said strip overlying the plate and having its free edge spaced from the upturned edge, a division strip extending longitudinally between the plate and strip, said first mentioned strip and division strip provided with apertures, the apertures of one strip offset from the apertures of the other, means for adjusting the first mentioned strip transversely of the plate, and a flexible metal strip turned back upon itself to form a tongue, said tongue adapted to enter between the first mentioned strip and the upturned portion of the plate.

2. A weather strip, including a plate formed with an upturned longitudinal edge, a strip secured along that edge of the plate remote from the upturned edge and overlying the plate with its free edge spaced from the upturned edge of the plate, a rib formed longitudinally of the strip, the said strip provided with discharge apertures, means for adjusting the strip transversely of the plate to regulate the opening between the strip and the upturned edge of the plate, and a strip bent back upon itself to form a tongue adapted to enter between the first mentioned strip and the upturned edge of the plate with its edge resting upon the rib.

3. A weather strip, including a plate formed with an upturned longitudinal edge, a strip secured along that edge of the plate remote from the upturned edge and overlying the plate with its free edge spaced from the upturned edge of the plate, means for adjusting the strip transversely of the plate, and a flexible metal strip bent back upon itself to form a tongue adapted to enter between the first mentioned strip and the upturned edge of the plate.

In testimony that I claim the foregoing as my own, I have hereto affixed my signature in the presence of two witnesses.

CLARENCE M. EVELETH.

Witnesses:
 EDWARD L. ENGLAND,
 EDWIN T. PEIFER.